United States Patent [19]

Alden

[11] Patent Number: 5,351,510
[45] Date of Patent: Oct. 4, 1994

[54] COVER LOCK FOR PRESSURE TRANSMITTER

[75] Inventor: Jerome S. Alden, Aurora, Ohio

[73] Assignee: Elsag International B.V., Amsterdam, Netherlands

[21] Appl. No.: 976,403

[22] Filed: Nov. 13, 1992

[51] Int. Cl.⁵ .................................................. B65D 55/14
[52] U.S. Cl. ............................................... 70/63; 70/170; 292/256.5; 220/4.21; 220/325
[58] Field of Search .......................... 70/57, 58, 63, 158, 70/163–173, 229–232; 292/256.5, DIG. 11, DIG. 34; 220/581, 582, 4.07, 4.21, 325, 692, 693

[56] References Cited

U.S. PATENT DOCUMENTS

| | | | |
|---|---|---|---|
| 1,413,081 | 4/1922 | Watson | 292/256.5 |
| 2,162,480 | 6/1939 | Forbes | 220/325 X |
| 3,162,338 | 12/1964 | Grubelic | 220/325 X |
| 3,206,955 | 9/1965 | Horovitz | 70/232 X |
| 3,244,312 | 4/1966 | Lawson | 220/4.21 |
| 3,269,159 | 8/1966 | Young | 70/232 |
| 3,322,262 | 5/1967 | Puente | 220/4.21 X |
| 3,468,577 | 9/1969 | Winston et al. | 220/325 X |
| 3,498,493 | 3/1970 | Kemp | 220/325 |
| 3,812,279 | 5/1974 | Voegeli | 70/170 X |
| 3,837,692 | 9/1974 | Ayers et al. | 70/63 X |
| 4,120,182 | 10/1978 | Michelman et al. | 70/63 |
| 4,198,087 | 4/1980 | Cornell et al. | 292/256.5 X |
| 4,284,300 | 8/1981 | Campbell | 70/231 X |
| 4,333,580 | 6/1982 | Sweigart, Jr. | 220/4.21 X |
| 4,377,243 | 3/1983 | Shaw et al. | 70/167 X |
| 4,378,742 | 4/1983 | Saylor et al. | 292/256.5 X |
| 4,379,513 | 4/1983 | Basterfield et al. | 220/325 |
| 4,777,812 | 10/1988 | Haugen | 70/232 |

FOREIGN PATENT DOCUMENTS

| | | | |
|---|---|---|---|
| 615557 | 1/1927 | France | 220/325 |
| 760507 | 10/1956 | United Kingdom | 220/325 |

Primary Examiner—Peter M. Cuomo
Assistant Examiner—Suzanne L. Dino
Attorney, Agent, or Firm—Michael M. Rickin; Paul R. Katterle

[57] ABSTRACT

A cover lock assembly for a process transmitter having threadably removable end caps and corrugated outer surfaces is provided for engaging the corrugated surfaces by way of a toothed cover lock which is removably affixed to the transmitter housing.

20 Claims, 3 Drawing Sheets

COVER LOCK FOR PRESSURE TRANSMITTER

BACKGROUND OF THE INVENTION

1. Field of the Invention

The present invention relates to process instruments such as pressure transmitters which have end caps that are threaded for removal and more particularly to locking mechanisms for such end caps.

2. Description of the Prior Art

Process instrumentation such as pressure transmitters are known wherein the end covers of the transmitter have outwardly projecting flanges having a bolt hole therein. The end cover is screwed on to the transmitter until tight and the bolt hole is aligned with a threaded bolt hole in the transmitter housing itself. A bolt is then passed through the flange and the bolt hole with the bolt threaded in to thereby lock the flange to the transmitter housing and thus lock the end cover to the same housing preventing the unthreading of the cover until the bolt is removed freeing the flange from the transmitter housing.

Although this type of cover lock prevents the accidental unscrewing of the end caps, the bolt, when removed, is sometimes lost and the cover lock's purpose is thereby defeated. Similarly, the flange is difficult to align with the bolt hole in the housing causing either a loose fit between the housing and the end cap or in some cases an overturning of the end cap which may cause the threads on the housing to be stripped in an attempt to align the flange with the bolt hole. Note that the aluminum die casting alloy typically used in this industry for transmitter housings and end caps is indeed sensitive to stripping and galling due to overtorqueing.

Other transmitter cover locks are known wherein each cover of the transmitter has a flange which is captured by a flat middle piece and is then screwed to the housing.

Again, there is the problem of alignment of the cover lock with the locking piece as well as the possibility of losing the locking piece whenever the assembly is unscrewed.

SUMMARY OF THE INVENTION

The present invention solves the problems associated with the prior art cover locks as well as others by providing a cover lock which is easily alignable with the transmitter end cap and which cannot be lost when the cover lock assembly is disengaged to permit the removal of the transmitter end cap.

To accomplish this the transmitter cover caps are made to be threadably removable from the transmitter housing which has complementary threads cut thereon. The outside surface of the end caps has a series of corrugations or raised surfaces formed along the entire circumference of the end cover adjacent to the transmitter housing. The cover lock is comprised of a removable rectangular shaped element having a plurality of projecting flanges at the bottom of this element which flanges are spaced and configured to fit in between adjacent corrugations on the end cover of the transmitter. The transmitter housing has a mounting pad formed therein adjacent to which the cover lock is threadably secured. To facilitate alignment of the cover lock with the corrugated end cover, the cover lock is designed to rotate circumferentially around the housing within the confines of an elongated opening retaining a locking screw therein. A strap connects the cover lock to the mounting base so that the removal of the cover lock from the mounting base, freeing the end cap for rotation around the transmitter body, still keeps the cover lock in the vicinity of the transmitter body by way of the strap connecting the cover lock to the mounting base of the transmitter body.

In view of the foregoing it is seen that one aspect of the present invention is to provide a transmitter end cap cover lock which is easily alignable with the transmitter end cap.

Another aspect of the present invention is to provide a transmitter cover lock which is easily removable from the transmitter end cap but which will not be easily lost.

Yet another aspect of the present invention is to provide a circumferentially movable cover lock which is easily alignable with the corrugated end cover.

These and other aspects of the present invention will be more clearly understood after review of the accompanying drawings when considered in conjunction with the following description of the preferred embodiment.

DESCRIPTION OF THE PREFERRED EMBODIMENT

Pressure transmitters are used extensively in various process control environments wherein the atmosphere outside of the transmitter could be hazardous and explosive. Accidental removal of the transmitter end covers would expose the electronics and terminals inside the transmitter to the explosive atmosphere and could cause an explosion. Thus, such transmitters must have a safe and secure locking mechanism to prevent the unwanted removal of the transmitter end covers from the transmitter.

Figure 1:
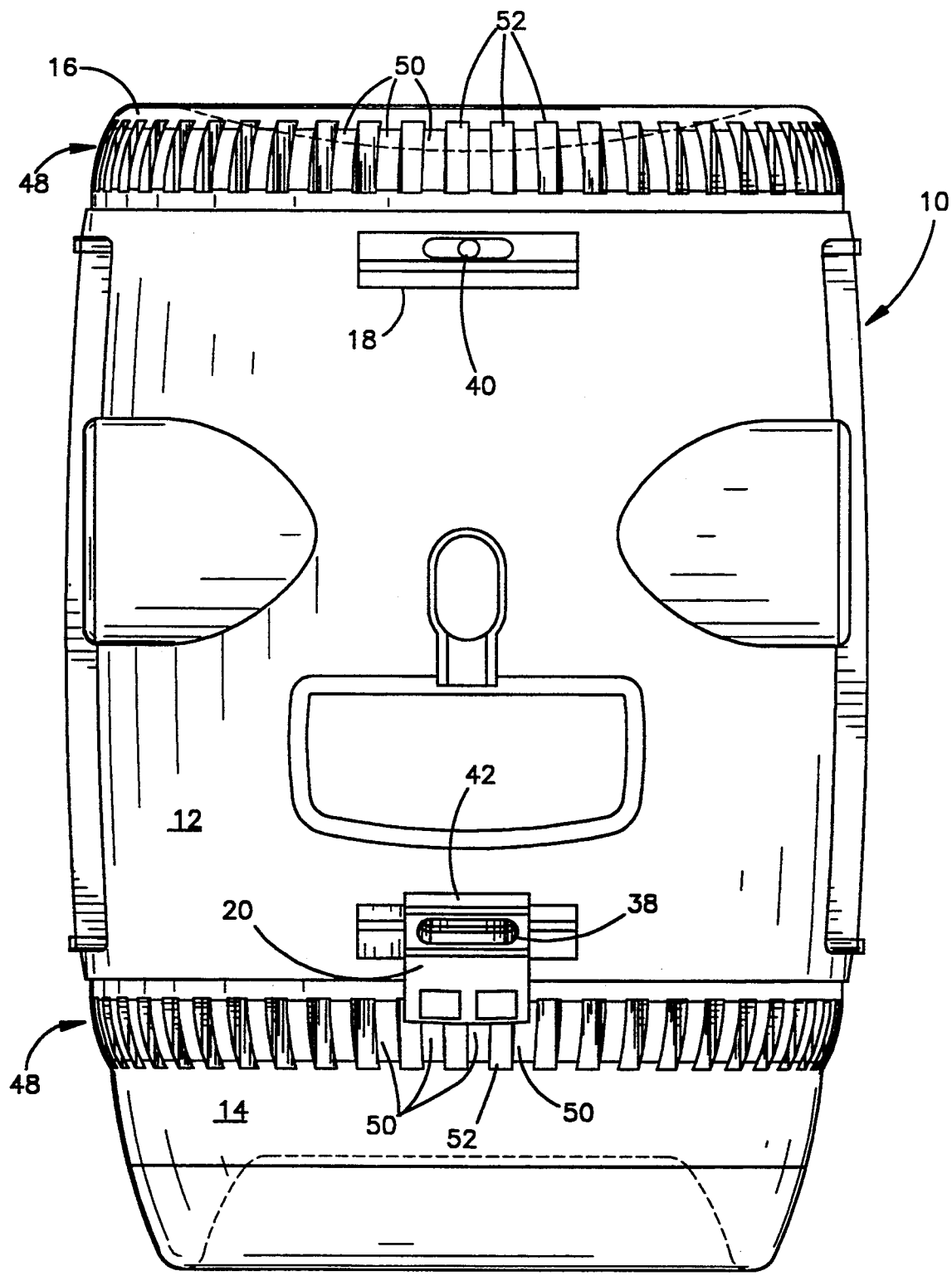
FIG. 1 is a top view of a pressure transmitter end cap cover lock of the present invention.
Figure 2:
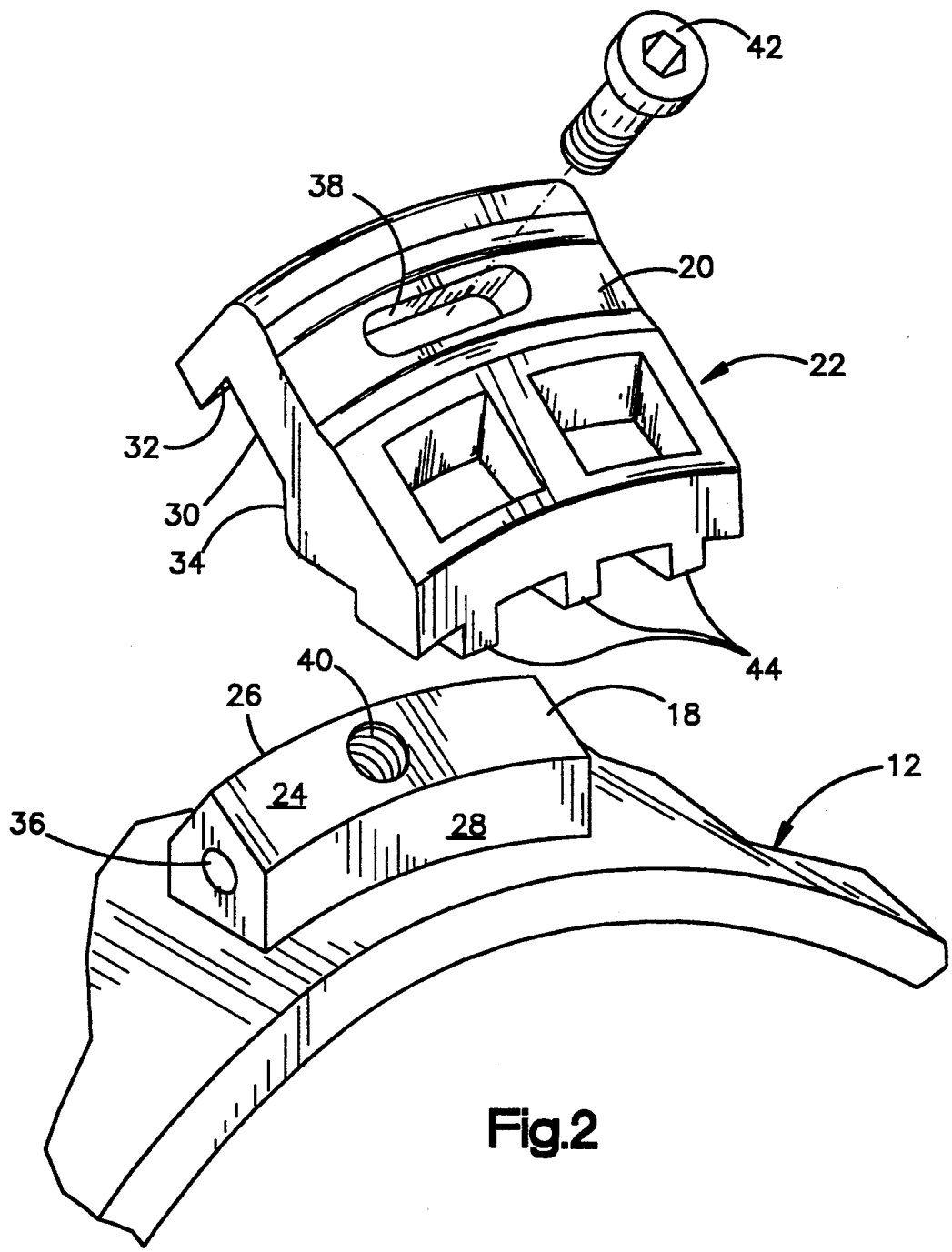
FIG. 2 is an isometric view of the cover lock of the present invention shown as being detached from the transmitter housing and the cover lock mounting base.

The present invention provides such a secure cover lock as may be best seen with references to FIGS. 1 and 2. A pressure transmitter assembly (10) is shown to have an outer casing (12) which contains the transmitter components therein with these components being accessible by way of threaded end caps (14, 16). Each end cap (14, 16) has internal threads (not shown) which are complementary to the threads (not shown) on the transmitter outer casing (12). Each end cap (14, 16) may be unscrewed to allow access to the pressure transmitter electronic components located inside the outer casing (12).

Along the edges of the outer casing (12), adjacent to the threaded end caps (14, 16) are located end cover mounting bases or pads (18) to which a cover lock (20) is threadably attached to form a cover lock assembly (22).

The cover lock assembly (22) has the end cover mounting base (18) formed as a substantially rectangular base with a triangular top portion (see FIG. 2) comprising top surfaces (24, 26) along with a front end surface (28). These surfaces (24, 26) along with a front end surface (28), are complementary to respective indentations (30, 32, 34) on the cover lock (20). The mounting base (18) also has a threaded hole (36) located at one end for mounting a strap or umbilical cord which will be described later. Also a threaded hole (40) is located on the surface (24) for mounting the cover lock (20) to the base (18). Surfaces (24, 26, 28) are designed to be at a substantially oblique angle to one another (as are similarly the mating surfaces of the cover lock (20)) so that as the cover lock (20) rotates on these surfaces (24, 26 and 28) it is constrained against twisting away from the end cap. These surfaces (24, 26 and 28) allow the cover lock (20) only one degree of freedom of motion; that is, circumferential rotation about the housing. These surfaces (24, 26 and 28) are critical to the end cap (14, 16) locking ability of the overall lock assembly (22) because the single threaded fastener (42) (for convenience and speed of operation) is not sufficient on its own to provide a locking means with integrity to resist end cap (14, 16) loosening influences due to vibration and unauthorized attempts at entry into the housing.

The cover lock (20) allows an inherent break-away torque to be designed-in simply by making the cover lock (20) out of a more or less strong and stiff material. The break-away feature will allow the cover lock (20) to fail first in the event of severe untorqueing of the end cap without first loosening the cover lock (20). In this manner, more costly and difficult parts to replace (such as the end cap and transmitter housing) are protected. A best known embodiment is to make the cover lock (20) out of molded thermoplastic 30% glass. The cover lock (20) is thus designed to rotate circumferentially about the housing (12) in order to allow easy alignment to an end cap (14, 16) which has been screwed onto the housing (12) at a proper torque (and therefore a fixed position), and then the cover lock (20) can be threadably secured to the housing thereby locking the end cap (14, 16) to the housing. The cover lock (20) rotates circumferentially on housing pad (18) surfaces (24, 26, 28) and is infinitely positionable on these surfaces with an elongated and curved center slot or annulus (38) to allow a single threaded fastener (42) (for convenience) located on center on the housing pad (18) to be sufficient for threadably securing the cover lock (20) to the housing pad (18) regardless of cover lock (20) position.

The cover lock (20) has an elongated annulus (38) formed through the top surfaces thereof for retaining a screw (42) therein in a captive manner. The screw (42) has threads compatible to those in the bore of the hole (40) in the mounting base (18) and is used to solidly affix the cover lock (20) to the base (18). The screw (42) may be retained to the cover lock (20) by means of a retaining washer threaded above the threaded portion of the screw (42) which will be located on the other side of the elongated annulus (38) to prevent the screw (42) from falling out of the annulus (38) while allowing it to be freely threaded into the bore (40). The front portion of the cover lock (20) has three tooth-like projections (44) which are used to lock the end covers (14, 16) in place once the cover lock (20) is firmly secured to the base (18). The toothed portions (44) and the retaining washer (46) may be best seen by reference to FIGS. 4 and 5 of the drawings.

To describe how the cover lock assembly (22) firmly locks the end covers (14, 16) in place it should first be noted that each of the end covers (14, 16) have a corrugated or dimpled area (48) extending along the circumference of each end cover (14, 16) proximate to the opposite end portions of the outer case (12). Although a wide range of pitches of corrugations on the end cap (14, 16) and corresponding cover lock (20) will work, a best known embodiment is suggested at an approximate pitch of 0.2" 5.08 mm. Furthermore, in order to reduce the overall size of the lock assembly (22) to a minimum, (for down-sizing purposes) the range of circumferential motion of the cover lock can be limited to plus and minus 0.5–1.0 times the pitch distance without loss of function. A best known embodiment is suggested at $+/-$ 0.6 times the pitch distance from a center position. This will require the cover lock (20) piece to be moved either to the left or to the right of center in order to engage the corrugations of the end cap depending on where the end cap (14, 16) came to rest when its own final tightening torque was reached. The mounting base (18) [see FIG. 1] is located adjacent the corrugated or dimpled areas (48) but is affixed to the outer case (12). The cover lock (20) is mounted to the mounting base (18) by the screw (42) being threaded into the hole (40). This allows the teeth (44) on the front face of the cover lock (20) to engage the open or valley portions (50) of the dimpled area (48) located in between raised portions (52). Thus, it can be seen that the height of each tooth (44) on the cover lock (20) is approximately equal to the depth of the valley portions (50) adjacent to the elevated or raised portions (52) of the corrugated surface (48). Similarly, the width of each tooth (44) is approximately equal to the width between the raised portions (52). Thus, by means of the elongated (38) on the cover lock (20), no matter where the threaded end cap (14, 16) is threadably located on the housing (12), it is a simple matter to capture three adjacent valley portions (50) on the end cap with the three toothed portions (44) of the cover lock (20) by screwing the cover lock (20) to the mounting base (18) to provide a firm engagement of the teeth (44) into the valley portion(50) of the corrugated surface of each end cap (14, 16).

Should an operator desire to remove one of these end caps (14, 16), for example, to perform an internal adjustment of the transmitter assembly, he need only unscrew the screw (42) until the teeth (42) are loose enough to clear the rinsed (52) and valley portions (50) forming the corrugated circumference (48) on each end cap (14, 16). When this is accomplished, each end cap (14, 16) is free to be rotated and removed. When the operator is through with the internal adjustment of the transmitter assembly (10), the procedure is reversed by threading the end cap (14, 16) back on to the outer case (12) and then screwing down the cover lock (20) to the mounting base (18) to engage the threaded or toothed portions (44) with the valley portions (50) of each end cover (14, 16).

Figure 3:
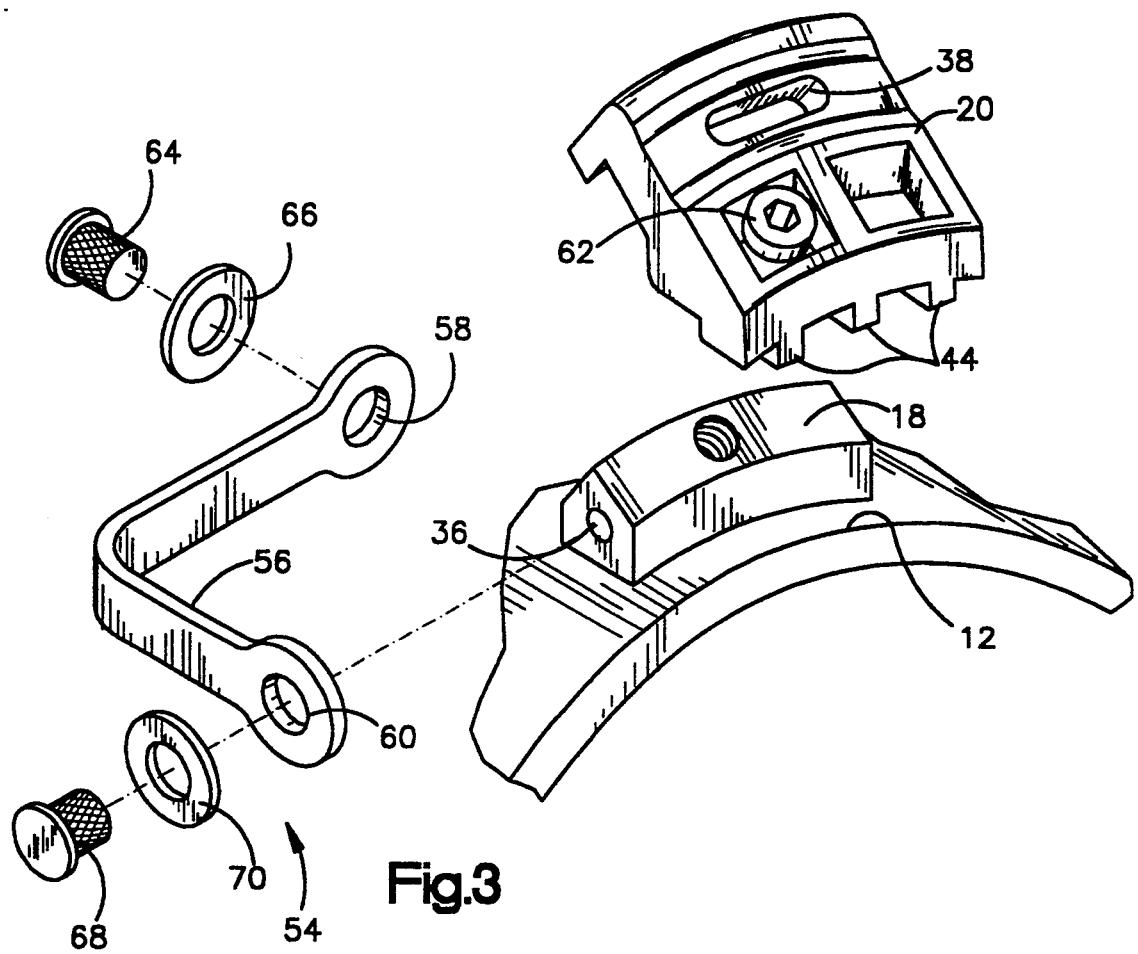
FIG. 3 is a view of the cover lock strap or umbilical cord shown with respect to the mounting areas on the cover lock and the cover lock mounting base.
Figure 4:
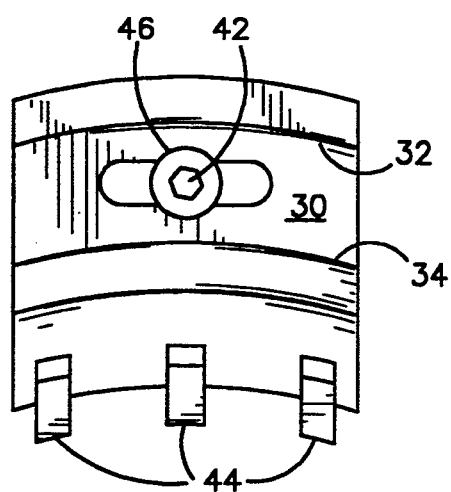
FIG. 4 is a bottom view of the cover lock of the present invention showing the flanged or teeth members used to engage the corrugated surface of the transmitter cover.
Figure 5:
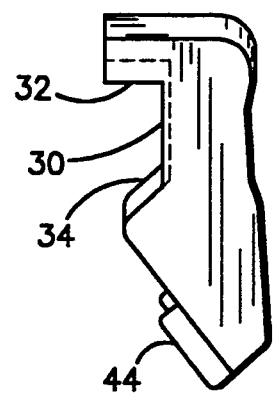
FIG. 5 is a side view of the cover lock as shown in FIG. 4.

As was mentioned earlier, the screw (42) is retained to the cover lock (20) by way of the washer (46) located on the inside portion of the cover lock as may be best seen with reference to FIG. 4. Thus, even if the cover lock (20) is fully removed from the base (18) the screw (42) will be retained thereto and will not be lost when the cover lock (20) must be again re-engaged. To prevent the cover lock (20) from being entirely lost, a strap or umbilical cord assembly (54) is provided which may be base seen with reference to FIG. 3.

The strap assembly (54) is comprised of a retaining strap (56) made of a polypropylene or similarly flexible plastic material which has formed openings (58, 60) at opposite ends of the strap (56). One end of the strap (56) is affixed to the cover lock (20) by screwing the strap (56) to an embossed area (62) located on the top surface of the cover lock (20) by way of a screw (64). A washer (66) may be utilized to prevent the removal of the screw (64) by vibrations. Similarly, the other end of the strap (60) is mounted to the mounting base (18) by screwing the end (60) of the strap (56) to the hole (36) by way of a screw (68) and washer (70). This keeps the cover lock affixed to the transmitter housing (12) even in situations where the cover lock is completely removed from its base to allow the easy removal of an end cap (14, 16).

Certain modifications and improvements have been deleted herein for the sake of conciseness and readability. However, it will be understood that all such modifications and improvements are intended to be fully covered within the scope of the appended claims. By way of example and not limitation, the strap or umbilical cord assembly (54) could be made integral with one or both of either the cover lock (20) and/or mounting base (18), and molded in a single operation. Due consideration would be given, of course, to the material for such a cord so that excessive bending of same would not cause breakage, leading to the separation of the cover lock (20) from the housing (12).

I claim:

1. A locking assembly for a device having a main body with a rotatably removable end cap, said end cap having a circumferential corrugated surface, said locking assembly comprising:
   a mounting base affixed to the main body of said device proximate to the removable end cap of said device; and
   a locking mechanism being mountable to said mounting base to having an end portion extend over the end cap of said device, said end cap circumferential corrugated surface interfacing with the end portion of said locking mechanism to interfere with the rotation of the end cap on said device whenever said locking mechanism is mounted to said mounting base, said locking mechanism including means for allowing said locking mechanism to rotate circumferentially along said main body to allow alignment of said locking mechanism end portion with said end cap circumferential corrugated surface.

2. A locking mechanism as set forth in claim 1, wherein the end portion of said locking mechanism has at least one tooth fitting into the corrugated surface of the end cap to interfere with the rotation of the end cap.

3. A locking mechanism as set forth in claim 2, wherein the corrugated surface of the end cap has a series of raised and valley portions and the end portion of said locking mechanism has a plurality of teeth sized to fit into adjoining valley portions of the corrugated surface.

4. A locking mechanism as set forth in claim 1, including strap means for retaining said locking mechanism proximate to said mounting base whenever said locking mechanism is removed from said mounting base.

5. A locking mechanism as set forth in claim 4, wherein said strap means includes a flexible cord connected to the side of said mounting base at one end and to the top of said locking mechanism at the other end.

6. A locking mechanism as set forth in claim 1, wherein said means for allowing said locking mechanism to rotate circumferentially along said main body is an annular opening along a front portion thereof, said annular opening having a captive screw therein for retaining said locking mechanism to said mounting base by affixing the screw into a bore on said mounting base.

7. A locking mechanism as set forth in claim 6, wherein said mounting base is angled toward the corrugated surface of the end cap and said locking mechanism has a complementary surface located along the annular opening of said locking mechanism to thus guide the interfering end portion of the locking mechanism into the corrugated portion of the end cover whenever said locking mechanism is affixed to the said mounting base.

8. An instrument having a rotatably removable end cover for gaining access to the interior thereof comprising:
   a main body having a mounting base affixed thereto proximate the end cover;
   an end cover rotatably mounted to said main body having a circumferential band of raised portions with valley portions therebetween located proximate the mounting base; and
   locking means mounted to the mounting base of said main body for placing interfering members into the valley portions of the circumferential band to prevent the rotation of the end cover thereby, said locking means including an end portion extending over said end cover and means for allowing said locking means to rotate circumferentially along said main body to thereby allow alignment of said interfering members with said circumferential band valley portions.

9. An instrument as set forth in claim 8, wherein said locking means includes a series of raised and valley portions and the end portion of said locking means includes a tooth member alignable with a valley portion of said end cover.

10. An instrument as set forth in claim 9, wherein said circumferential rotating means allows said locking means to rotate circumferentially along said main body to allow alignment of the tooth member with a valley portion of said end cover.

11. An instrument as set forth in claim 10, wherein said circumferential means includes an elongated annular opening in said locking means which allows the slidable movement of said locking means along the mounting base of said locking means prior to being locked thereto.

12. An instrument as set forth in claim 11, including a screw captured within said annular opening to be slidably moveable therein and being alignable with a bore in said mounting base.

13. An instrument as set forth in claim 8, including a strap means for retaining said locking mechanism proximate to said mounting base whenever said locking mechanism is removed from said mounting.

14. An instrument as set forth in claim 13, wherein said strap means includes a flexible cord connected to the side of said mounting base at one end and to the top of said mounting base at the other end.

15. A locking mechanism for locking a rotatable element of an assembly to a stationary element of the assembly comprising:
   a) a circumferential corrugated surface on said rotatable element;
   b) means for moving the locking mechanism circumferentially along the stationary element to align it with a desired portion of the rotatable element circumferential corrugated surface; and means for placing the locking mechanism into an interfering position with said desired portion of the circumferential corrugated surface on said rotatable element to prevent the rotation of the rotatable element.

16. A locking mechanism as set forth in claim 15 wherein said means for placing said locking mechanism into an interfering position comprises at least one tooth which fits into said rotatable element circumferential corrugated surface to prevent the rotation of the rotatable element.

17. A locking mechanism as set forth in claim 16 wherein said rotatable element circumferential corrugated surface has a series of raised and valley portions and said means for placing said locking mechanism into an interfering position further compress a plurality of teeth sized to fit into adjoining valley portions of said circumferential corrugated surface.

18. A locking mechanism as set forth in claim 15 wherein said stationary element has a mounting base affixed thereto proximate to said rotatable element and said means for moving the locking mechanism along the stationary element comprises an annular opening along a front portion thereof having a captive screw therein for retaining said locking mechanism to said stationary element by affixing the screw into a bore on said stationary element.

19. An instrument having a rotatably removable end cover for gaining access to the interior thereof comprising:

a main body having a mounting base affixed thereto proximate the end cover;

an end cover rotatably mounted to said main body having a circumferential band of raise portions with valley portions therebetween located proximate the mounting base; and locking means mounted to said mounting base for placing interfering members into said circumferential band valley portions to prevent the rotation of the end cover thereby, said locking means including circumferential rotating means for allowing said locking means to rotate circumferentially along said main body to allow alignment of said interfering members with said circumferential band valley portions.

20. A locking assembly for a device having a main body with a rotatably removable end cap, said end cap having a circumferential corrugated surface, said locking assembly comprising:

a mounting base affixed to the main body of said device proximate to the removable end cap of said device; and a locking mechanism being mountable to said mounting base to have an end portion extend over the end cap of said device, said end cap circumferential corrugated surface interfacing with the end portion of said locking mechanism to interfere with the rotation of the end cap on said device whenever said locking mechanism is mounted to said mounting base, said locking mechanism having an annular opening along a front portion, said mounting base angled toward the corrugated surface of the end cap and said locking mechanism having a complementary surface located along the annular opening to thus guide the interfering end portion of the locking mechanism into the corrugated portion of the end cover whenever said locking mechanism is affixed to said mounting base.

* * * * *